United States Patent
Kim

(10) Patent No.: US 7,312,833 B2
(45) Date of Patent: Dec. 25, 2007

(54) CHANNEL EQUALIZING APPARATUS AND METHOD FOR DIGITAL TELEVISION RECEIVER

(75) Inventor: Gang Ho Kim, Seoul (KR)

(73) Assignee: LG Electronics Inc., Seoul (KR)

( * ) Notice: Subject to any disclaimer, the term of this patent is extended or adjusted under 35 U.S.C. 154(b) by 345 days.

(21) Appl. No.: 10/372,112

(22) Filed: Feb. 25, 2003

(65) Prior Publication Data

US 2003/0160896 A1   Aug. 28, 2003

(30) Foreign Application Priority Data

Feb. 27, 2002  (KR) ............................... 2002-10568

(51) Int. Cl.

| | |
|---|---|
| H04N 5/00 | (2006.01) |
| H04N 5/44 | (2006.01) |
| H04N 5/455 | (2006.01) |
| H04N 7/04 | (2006.01) |
| H04B 1/10 | (2006.01) |
| H04B 3/04 | (2006.01) |
| H04B 3/14 | (2006.01) |
| H04L 25/03 | (2006.01) |
| H04L 25/08 | (2006.01) |
| H03K 5/01 | (2006.01) |
| H03K 5/159 | (2006.01) |

(52) U.S. Cl. ...................... 348/607; 348/470; 348/536; 348/614; 348/725; 348/726; 375/229; 375/231; 375/233; 375/346; 375/350; 333/18; 333/28 R

(58) Field of Classification Search ................ 348/470, 348/536, 607, 614, 725–728; 375/229, 233, 375/346, 350; 333/18, 28 R; 708/322, 323

See application file for complete search history.

(56) References Cited

U.S. PATENT DOCUMENTS

| | | | | |
|---|---|---|---|---|
| 5,654,765 | A | * | 8/1997 | Kim ........................... 348/614 |
| 5,841,484 | A | * | 11/1998 | Hulyalkar et al. .......... 348/607 |
| 6,141,378 | A | * | 10/2000 | d'Oreye de Lantremange .......... 375/232 |
| 6,275,554 | B1 | * | 8/2001 | Bouillet et al. ............. 375/371 |
| 6,298,100 | B1 | * | 10/2001 | Bouillet ...................... 375/326 |
| 6,426,972 | B1 | * | 7/2002 | Endres et al. ................ 375/229 |
| 6,445,423 | B1 | * | 9/2002 | Bouillet et al. ............. 348/537 |
| 6,490,007 | B1 | * | 12/2002 | Bouillet et al. ............. 348/614 |

(Continued)

OTHER PUBLICATIONS

"Blind Equalization Techniques for xDSL using Channel Coding and Precoding," Wolfgang H. Gerstacker et al., AE Int. J. Electr. Commun., 53 (1999) No. x, 1-1, pp. 1-11, Erlangen, Germany Nrnberg Cauerstrae 7/NT, URL= http://citeseer.ist.psu.edu/gerstacker99blind.html.

(Continued)

Primary Examiner—Brian P. Yenke
(74) Attorney, Agent, or Firm—Harness, Dickey & Pierce, P.L.C.

(57) ABSTRACT

Disclosed is a channel equalizing apparatus and method for a digital television receiver that performs channel equalization using equalizing algorithms. The channel equalizing apparatus includes a channel equalizing section for compensating for channel distortion using a blind algorithm and a decision directed algorithm among equalizing algorithms, and a equalizing control section for calculating error values for compensating for the channel distortion from the blind algorithm and the decision directed algorithm and controlling the channel equalizing section to compensate for the channel distortion according to the calculated error values.

10 Claims, 3 Drawing Sheets

U.S. PATENT DOCUMENTS

| | | | |
|---|---|---|---|
| 6,671,339 B1* | 12/2003 | Ahn | 375/346 |
| 6,693,958 B1* | 2/2004 | Wang et al. | 375/232 |
| 6,697,098 B1* | 2/2004 | Wang | 348/21 |
| 6,707,861 B1* | 3/2004 | Stewart | 375/321 |
| 6,734,920 B2* | 5/2004 | Ghosh et al. | 348/614 |
| 6,744,474 B2* | 6/2004 | Markman | 348/607 |
| 6,816,548 B1* | 11/2004 | Shiue et al. | 375/233 |
| 6,823,489 B2* | 11/2004 | Wittig et al. | 714/792 |
| 6,894,728 B2* | 5/2005 | DSouza | 348/614 |
| 6,963,604 B2* | 11/2005 | Erdogmus et al. | 375/232 |
| 2001/0016003 A1* | 8/2001 | Kim | 375/232 |
| 2002/0001043 A1* | 1/2002 | Lee | 348/512 |
| 2002/0036714 A1* | 3/2002 | Markman | 348/607 |
| 2002/0154247 A1* | 10/2002 | Ghosh et al. | 348/614 |
| 2002/0172275 A1* | 11/2002 | Birru | 375/233 |
| 2002/0186763 A1* | 12/2002 | Kennedy et al. | 375/232 |
| 2003/0001974 A1* | 1/2003 | DSouza | 348/614 |
| 2003/0007554 A1* | 1/2003 | Birru | 375/233 |
| 2003/0012274 A1* | 1/2003 | Markman et al. | 375/232 |
| 2003/0227968 A1* | 12/2003 | Kim et al. | 375/233 |
| 2004/0109092 A1* | 6/2004 | Markman et al. | 348/726 |
| 2004/0135928 A1* | 7/2004 | Kim | 348/726 |
| 2004/0145681 A1* | 7/2004 | Jun | 348/607 |

OTHER PUBLICATIONS

"A Transmission Scheme For Twisted Pair Lines With Coding, Precoding, and Blind Equalization," Wolfgang H. Gerstacker et al., Proc. of IEEE Global Telecommunications Conf. (GLOBECOM '97), pp. 52-56, Phoenix, AZ, Nov. 1997, URL= http://citeseer.ist.psu.edu/gerstacker97transmission.html.

"A New Sufficient-Order Blind Equalization Scheme," Vijay Jain, Master's Degree Thesis, Department of Electrical and Computer Engineering, Concordia University, Montreal, Canada, Aug. 1999, pp. vi-vii, xvi-xvii, 26-31, 43-44 and 117-120, URL= http://www.collectionscanada.ca/obj/s4/f2/dsk1/tape8/PQDD_0006/MQ43652.pdf.

"On the Convergence of Blind Channel Equalization," Ye Li et al., Technical Report of SRC of University of Maryland, T.R. 95-47, pp. 1-22, http://citeseer.ist.psu.edu/221932.html, Apr. 21, 1995.

* cited by examiner

→ Real Signal
⇒ Complex Signal

CHANNEL EQUALIZING APPARATUS AND METHOD FOR DIGITAL TELEVISION RECEIVER

This application claims the benefit of the Korean Application No. P 2002-10568 filed on Feb. 27, 2002, which is hereby incorporated by reference.

BACKGROUND OF THE INVENTION

1. Field of the Invention

The present invention relates to a channel equalizing apparatus for a digital television receiver that performs channel equalization using an equalizing algorithm.

2. Discussion of the Related Art

Generally, communication is performed in such a manner that a transmitting end modulates a signal and transmits the modulated signal, and a receiving end receives and demodulates the transmitted signal to the original signal. During the communication, however, a signal distortion may be produced due to elements such as amplifiers, filters, etc., installed in the transmitting end and the receiving end or various factors of communication paths. Accordingly, an incomplete signal is received in the receiving end, and this makes it difficult for the receiving end to restore to the original signal.

Also, the characteristic of the signal distortion varies with the lapse of time, and it is more difficult for the receiving end to restore to the original signal. Accordingly, the receiving end uses an adaptive channel equalizer in order to restore to the original signal by compensating for the distortion.

The adaptive channel equalizer is divided into a blind equalizer and a non-blind equalizer.

The non-blind equalizer periodically inserts a training signal sequence into a transmitted signal sequence and performs channel equalization using this training signal sequence. Meanwhile, the blind equalizer performs the channel equalization by its own efforts only by the received signal without any help of the training signal sequence.

Since the non-blind equalizer performs the channel equalization with the training signal sequence that is the same as the signal transmitted from the transmitting end, the equalizer can rapidly converge, and has a superior convergence characteristic. However, it should periodically provide the training signal sequence, and this causes the transmission efficiency to deteriorate.

Meanwhile, the blind equalizer is briefly classified into a reduced constellation algorithm (RCA) and a constant modulus algorithm (CMA).

A representative of the reduced constellation algorithm is a Sato algorithm. This algorithm has the advantages in that it can be easily implemented and well converges in an environment where the signal distortion is not severe, but it has a great residual error after the convergence. Also, this algorithm has the disadvantages in that it cannot converge well or may converge on a wrong point in the environment where the signal distortion is great.

Meanwhile, a representative of the constant modulus algorithm is a Gordard algorithm. This algorithm has a good convergence characteristic and scarcely converges on a wrong point. Also, even if a frequency phase difference is produced, it can perform the channel equalization. However, it also has a great residual error like the reduced constellation algorithm and its implementation is complicated.

As described above, since the blind equalizer does not require the training signal sequence, its transmission efficiency is good, but it takes a lot of time for the equalizer to converge, and its convergence characteristic is not good. Accordingly, the blind equalizer normally sets a threshold value, and performs updating of a tap coefficient by a blind equalizing method before reaching the threshold value. After reaching the threshold value, it performs the updating of the tap coefficient by changing the blind equalizing method to the decision directed equalizing method, and thus the convergence characteristic is improved.

However, it is not easy to set the threshold value by the above-described methods.

Also, in order to change the blind equalizing method to the decision directed equalizing method when the equalizer reaches the threshold value, a signal-to-noise ratio (SNR) calculator, adder, counter, etc., are required. Also, since all calculations should be performed using the distorted signal inputted to the equalizer, the probability of incorrect resultant values becomes high as the signal distortion becomes severe, and thus the convergence characteristic of the equalizer is not good.

SUMMARY OF THE INVENTION

Accordingly, one or more embodiments of the present invention are directed to a channel equalizing apparatus and method for a digital television receiver that substantially obviate one or more problems due to limitations and disadvantages of the related art.

An object of at least one embodiment of the present invention is to provide a channel equalizing apparatus and method for a digital television receiver that can efficiently perform channel equalization using both a blind algorithm and a decision directed algorithm.

Additional advantages, objects, and features of the invention will be set forth in part in the description of example embodiments which follows and in part will become apparent to those having ordinary skill in the art upon examination of the following or may be learned from practice of the invention. The objectives and other advantages of the invention may be realized and attained by the example structure particularly pointed out in the written description and claims hereof as well as the appended drawings.

To achieve these objects and other advantages and in accordance with the purpose of the invention, an embodiment of the present invention provides a channel equalizing apparatus for a digital television receiver that may include a channel equalizing section for compensating for channel distortion using a blind algorithm and a decision directed algorithm among equalizing algorithms, and a equalizing control section for calculating error values for compensating for the channel distortion from the blind algorithm and the decision directed algorithm and controlling the channel equalizing section to compensate for the channel distortion according to the calculated error values.

An example embodiment of such an equalizing control section according to the present invention may include a decision directed error calculating section for calculating a decision directed error value, a Godard error calculating section for calculating a Godard error value, and a final error calculating section for calculating a final error value for compensating for the channel distortion using the decision directed error value and the Godard error value.

Such a decision directed error value can be calculated according to an embodiment of the present invention by steps that include generating a decision signal from an output of the channel equalizing section, and calculating a difference value between a phase of the decision signal and an output phase of the channel equalizing section.

Such a Godard error value can be calculated according to an embodiment of the present invention by steps that include squaring an absolute value of an output value of the channel equalizing section, calculating a difference value between a squared value and a predetermined constant value, and multiplying the difference value by the output value of the channel equalizing section.

Such a final error value can be calculated according to an embodiment of the present invention by steps that include calculating a first resultant value by multiplying the decision directed error value by a first constant, calculating a second resultant value by multiplying an absolute value of the decision directed error value by the Godard error value, calculating a third resultant value by multiplying the second resultant value by a predetermined second constant, and adding the third resultant value to the first resultant value.

An error value ($e^{MCMA}$) of the equalizing control section can be calculated according to an embodiment of the present invention by the following equation.

$$e^{MCMA} = k_1 e_{DD} + k_2 |e_{DD}| e_{godard}$$

Here, $$e_{gordard} = y_n(|y(n)|^2 - R_2), R_2 = \frac{E|a_n^4|}{E|a_n^2|},$$

$e_{DD}$ denotes a decision directed error value, $e_{godard}$ a Godard error value, $y_n$ an output value of the channel equalizing section, the original signal sent from a transmitting end, and $a_n$ $k_1$, $k_2$, R2 certain constants, respectively.

According to another embodiment of the present invention, a channel equalizing apparatus for a digital television receiver may include a channel equalizing section for compensating for channel distortion included in a received digital signal by performing a tap coefficient updating of a filter according to a blind algorithm for the channel distortion error values for compensating for the channel distortion from the blind algorithm and the decision directed algorithm and controlling the channel equalizing section to compensate for the channel distortion according to the calculated error values.

An example embodiment of such a channel equalizing section according to the present invention can update the tap coefficient of the filter by applying the following equation.

$$c_{n+1} = c_n - \mu x_n e^{MCMA}(n)$$

Here, $c_n$ denotes a tap coefficient value of the filter of the channel equalizing section, $x_n$ an input value of the channel equalizing section, $\mu$ a step size, and $e^{MCMA}$ an error value, respectively.

Also, the error value ($e^{MCMA}$) of the equalizing control section can be calculated according to an embodiment of the present invention by the following equation.

$$e^{MCMA} = k_1 e_{DD} - k_2 |e_{DD}| e_{godard}$$

Here, $$e_{gordard} = y_n(|y(n)|^2 - R_2), R_2 = \frac{E|a_n^4|}{E|a_n^2|},$$

denotes a decision directed error value, $e_{godard}$ a Godard error value, $y_n$ an output value of the channel equalizing section, $a_n$ an the original signal sent from transmitting end, and $k_1$, $k_2$, R2 certain constants, respectively.

According to still another embodiment of the present invention, a channel equalizing method (for a digital television receiver having a channel equalizing section for performing channel equalization and an equalizing control section for controlling the channel equalizing, section) may include the steps of calculating a Godard error value, e.g., by squaring an absolute value of an output value of the channel equalizing section, calculating a difference value between a squared value and a predetermined constant value, and multiplying the difference value by the output value of the channel equalizing section; calculating a decision directed error value, e.g., by generating a decision signal from the output of the channel equalizing section, and calculating a difference value, e.g., between a phase of the decision signal and an output phase of the channel equalizing section; calculating a final error value by calculating a first resultant value, e.g., by multiplying the decision directed error value by a first constant, calculating a second resultant value, e.g., by multiplying an absolute value of the decision directed error value by the Godard error value, calculating a third resultant value, e.g., by multiplying the second resultant value by a predetermined second constant, and adding the third resultant value to the first resultant value; and compensating for channel distortion included in a received digital signal, e.g., by updating a tap coefficient of a filter according to the final error value.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE INVENTION

Reference will now be made in detail to the preferred embodiment of the present invention, examples of which are illustrated in the accompanying drawings. Wherever possible, the same reference numbers will be used throughout the drawings to refer to the same or like parts.

Figure 1:
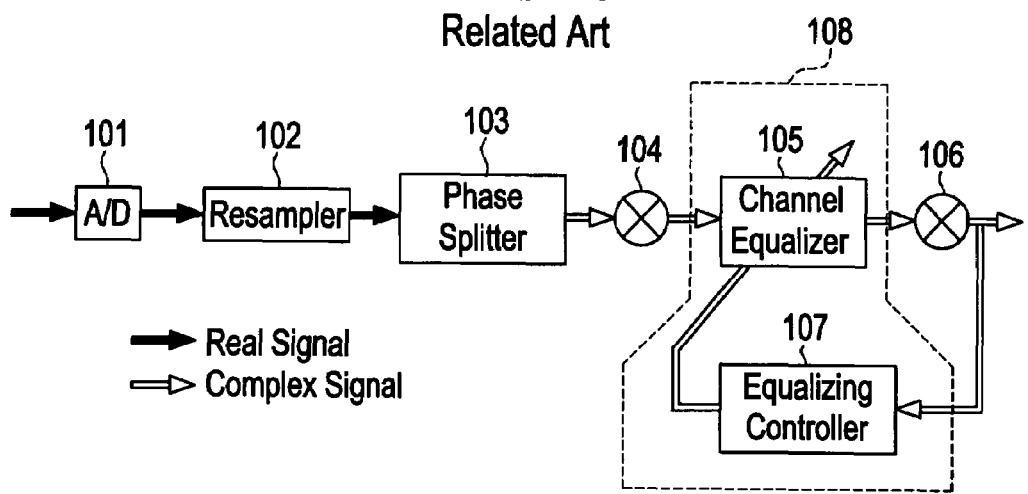
FIG. 1 is a schematic block diagram of a general digital television receiver.

FIG. 1 is a schematic block diagram of a general digital television receiver adopting a unit 108 to equalize the channel a channel equalizer. In FIG. 1, an analog-to-digital (A/D) converter 101 converts an inputted intermediate frequency (IF) analog signal into a digital signal, and outputs the digital signal to a resampler 102.

The resampler 102 receives timing errors of current symbols outputted through a baseband signal process, and performs interpolation so as to reduce errors among the digital signals outputted from the A/D converter 101. A phase splitter 103 splits an output signal of the resampler 102 into passband digital inphase and quadrature signals (I and Q signals). A demodulator 104 demodulates the passband digital I and Q signals to baseband digital I and Q signals, and outputs the baseband digital I and Q signals to a channel equalizer 105.

The channel equalizer 105 updates a tap coefficient of a filter in the channel equalizer 105 under the control of an equalizing controller 107. Also, the channel equalizer 105 compensates for channel distortion of a signal generated during transmission of data through a transmission channel, and outputs the compensated signal to a derotator 106. The derotator 106 compensates for phases of the baseband digital I and Q signals, of which the channel distortion is compensated for by the channel equalizer 105. At the same time, the derotator 106 feeds the compensated signal back to the equalizing control section 107.

Figure 2:
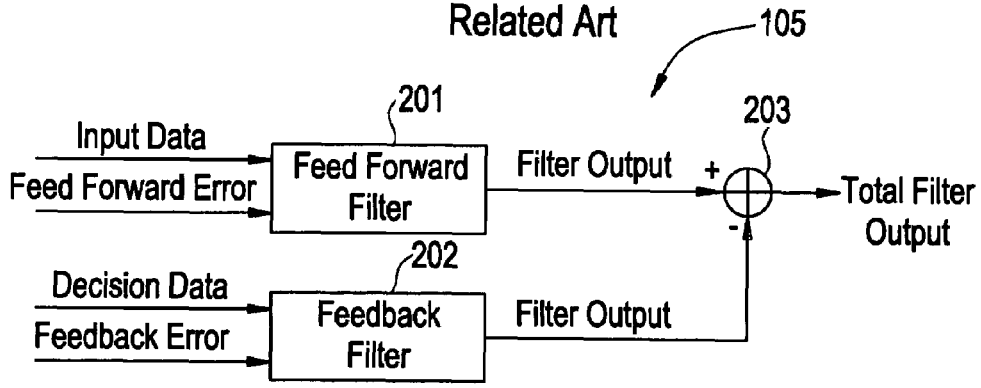
FIG. 2 is a block diagram illustrating an example of a channel equalizing section of FIG. 1.

FIG. 2 is a block diagram illustrating an example of the channel equalizing section of FIG. 1. In FIG. 2, a feed forward filter 201 offsets the effect of a near ghost by performing updating of the tap coefficient according to input data and a feed forward error value. A feedback filter 202 offsets the effect of a far ghost by performing updating of the tap coefficient according to decision data and a feedback error value. An adder 203 adds an output of the feed forward filter 201 and an output of the feedback filter 202, and outputs the added output to the derotator 106. Here, if a step size of the feed forward filter 201 and the feedback filter 202 becomes large, the convergence speed of the channel equalizer 105 becomes high, but the residual error becomes great after the convergence. By contrast, if the step size becomes small, the convergence speed becomes low, but the residual error becomes small after the convergence. The feed forward error inputted to the feed forward filter 201, the decision data inputted to the feedback filter 202, and the feedback error are provided from the equalizing controller 107.

The channel equalizer 105 is divided into a non-blind equalizer and a blind equalizer according to methods of performing the channel equalization.

Since the non-blind equalizer performs the channel equalization with the training signal sequence that is the same as the signal transmitted from the transmitting end, the equalizer can rapidly converge, and has a superior convergence characteristic. However, it should periodically provide the training signal sequence, and this causes the transmission efficiency to deteriorate.

Meanwhile, the blind equalizer is briefly-classified into a reduced constellation algorithm (RCA) and a constant modulus algorithm (CMA). A representative of the reduced constellation algorithm is a Sato algorithm, and the error in the equalizing controller 107 is obtained, e.g., by the following equation 1.

$$e_{sato}(n) = y_n - \alpha sgn(y_n) \quad (1)$$

$$\alpha = E[a_n^2]/E[a_n]$$

Here, $y_n$ denotes an output value of the equalizer, and $a_n$ denotes the original signal sent from the transmitting end.

Also, the updating of the tap coefficient of the feed forward filter 201 and the feedback filter 202 in the channel equalizer 105 is given, e.g., by the following equation 2.

$$c_{n+1} = c_n - \mu x_n e_{sato}(n) \quad (2)$$

Here, $c_n$ denotes a tap coefficient value of the equalizer, and $x_n$ denotes an input value of the equalizer.

The above-described reduced constellation algorithm has the advantages in that it can be easily implemented and well converges in an environment where the signal distortion is not severe, but it can exhibit a great residual error after the convergence. Also, this algorithm has the disadvantages in that it may not converge well or may converge on a wrong point in the environment where the signal distortion is great.

Meanwhile, a representative of the constant modulus algorithm is a Godard algorithm, and the error in the equalizing controller 107 is obtained, e.g., by the following equation 3.

$$e_{godard} = y_n(|y(n)|^2 - R_2) \quad (3)$$

Meanwhile, a representative of the constant modulus algorithm is a Gordard algorithm, and the error in the equalizing controller 107 is obtained by the following equation 3.

$$e_{gordard} = y_n(|y(n)|^2 - R_2), R_2 = \frac{E|a_n^4|}{E|a_n^2|} \quad (3)$$

Here, $y_n$ denotes an output value of the equalizer, and $a_n$ denotes the original signal sent from the transmitting end.

Also, the updating of the tap coefficient of the feed forward filter 201 and the feedback filter 202 in the channel equalizer 105 is given, e.g., by the following equation 4.

$$c_{n+1} = c_n - \mu x_n e_{gordard}(n) \quad (4)$$

Here, $c_n$ denotes a tap coefficient value of the equalizer, and $x_n$ denotes an input value of the equalizer.

This algorithm has a good convergence characteristic and scarcely converges on a wrong point. Also, even if a frequency phase difference is produced, it can perform the channel equalization. However, it also can exhibit a great residual error like the reduced constellation algorithm and its implementation can be complicated.

As described above, since the blind equalizer does not require the training signal sequence, its transmission efficiency is good, but it takes a lot of time for the equalizer to converge, and its convergence characteristic is not good. Accordingly, the blind equalizer normally sets a threshold value, and performs updating of a tap coefficient by a blind equalizing method before reaching the threshold value. After reaching the threshold value, it performs the updating of the tap coefficient by changing the blind equalizing method to the decision directed equalizing method, and the convergence characteristic is improved.

However, it is not easy to set the threshold value by the above-described methods.

Also, in order to change the blind equalizing method to the decision directed equalizing method when the equalizer reaches the threshold value, a signal-to-noise ratio (SNR) calculator, adder, counter, etc., are required. Also, since all calculations should be performed using the distorted signal inputted to the equalizer, the probability of incorrect resultant values becomes high as the signal distortion becomes severe, and thus the convergence characteristic of the equalizer is not good.

One or more embodiments of the present invention perform channel equalization by automatic conversion of (or, in other words, switching from reliance upon) the blind equalizing method into (to reliance upon) the decision directed equalizing method, e.g., via simultaneously applying the blind equalizing algorithm and the decision directed equalizing algorithm. According to one or more embodiments of the present invention, the Godard algorithm, which is the constant modulus algorithm, is used as the blind equalizing algorithm.

An example of the channel equalizing algorithm according to an embodiment of the present invention is given by the following equation 5.

$$e^{MCMA} = k_1 e_{DD} + k_2 |e_{DD}| e_{godard} \quad (5)$$

Here, $$e_{gordard} = y_n(|y(n)|^2 - R_2), R_2 = \frac{E|a_n^4|}{E|a_n^2|},$$

$e_{DD}$ denotes a modified CMA error, $e^{MCMA}$ a decision directed error, $e_{DD}$ a Godard error, $e_{godard}$ an output value of the equalizer, and $y_n$ the original signal sent from the transmitting end.

The tap coefficient updating is given, e.g., by the following equation 6.

$$c_{n+1} = c_n - \mu x_n e^{MCMA}(n) \quad (6)$$

Here, $c_n$ denotes a tap coefficient value of the equalizer, and $x_n$ denotes an input value of the equalizer.

Figure 3:
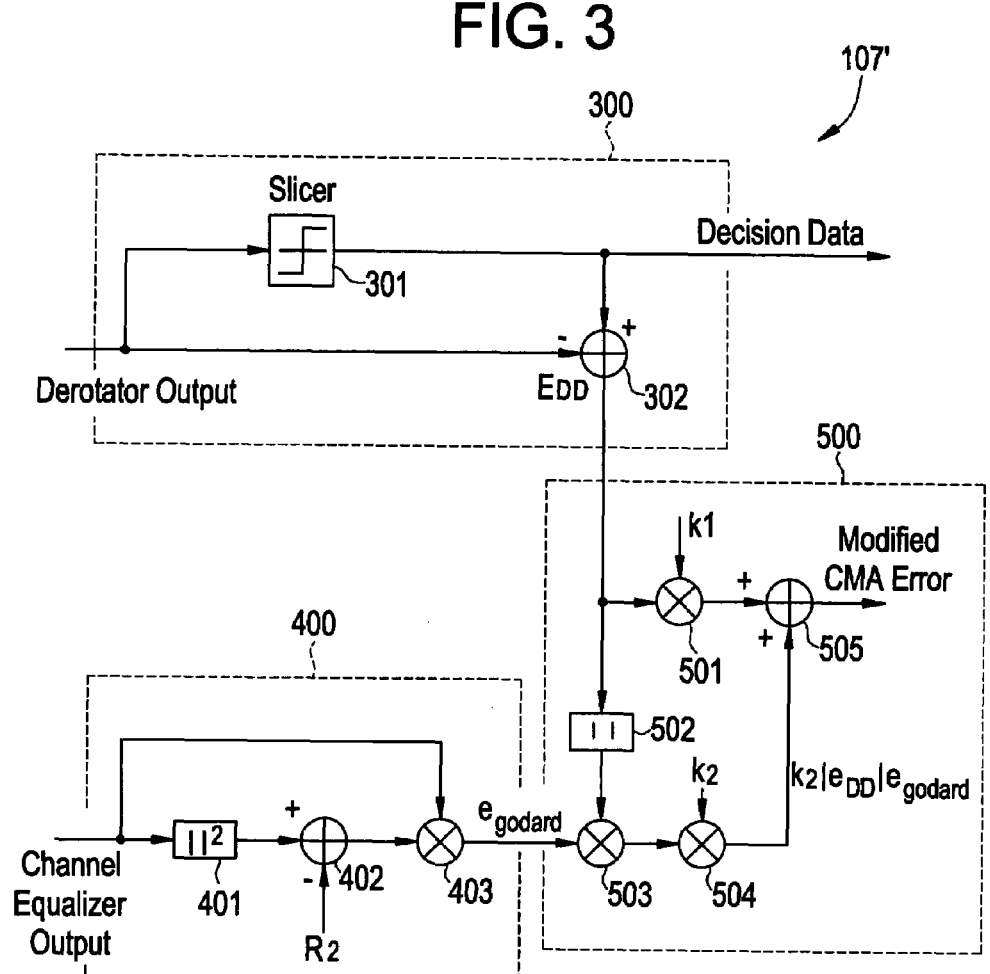
FIG. 3 is a detailed block diagram of a channel equalizing control section in a channel equalizing apparatus according to an embodiment of the present invention.

FIG. 3 is a detailed block diagram of a channel equalizing control section in a channel equalizing apparatus, according to an embodiment of the present invention, and shows an example of a hardware construction implementing the equation 5. As such, the channel equalizing control section corresponds to the equalizer controller 107 of FIG. 1 and thus can be thought of as an equalizing controller 107'. Where the unit 108 of general digital television receiver of FIG. 1 includes equalizing controller 107' rather than 107, such a unit can be thought of as a channel equalizing apparatus 108' according to an embodiment of the present invention, and such a receiver represents yet another embodiment of the present invention.

Referring to FIG. 3, the channel equalizing control section (in the channel equalizing apparatus according to an embodiment of the present invention) includes a decision directed error detecting section 300 for obtaining a decision directed error, a Godard error detecting section 400 for obtaining a Godard error, and a final error detecting section 500 for detecting a final error from outputs of the decision directed error detecting section 300 and the Godard error detecting section 400.

A slicer 301 of the decision directed error detecting section 300 generates a decision signal that matches each signal level of a baseband digital signal outputted from a derotator 106, and outputs the decision signal to a subtracter 302. The subtracter 302 obtains a decision directed error by obtaining the difference between the phase of the decision signal and the phase of the baseband digital signal outputted from the derotator 106, and outputs the decision directed error to the final error detecting section 500.

A square operator 401 of the Godard error detecting section 400 obtains an absolute value of an output y(n) of the channel equalizing section 105, squares the absolute value, and outputs a squared value to a subtracter 402. The subtracter 402 outputs a result obtained by subtracting a predetermined constant, e.g., ($R_2$, $R_2 = E|a_n^4|/E|a_n^2|$) from an output ($|y(n)|^2$) of the square operator 401, and outputs the result to a multiplier 403. The multiplier 403 obtains a Godard error $e_{godard}$ by multiplying an output of the subtracter 402 by a signal $y_n$ outputted from the channel equalizing section 105, and outputs the Godard error to the final error detecting section 500.

A multiplier 501 of the final error detecting section 500 multiplies the decision directed error of the decision directed error detecting section 300 by a predetermined constant k1, and outputs the multiplied output to an adder 505.

An absolute value operator 502 of the final error detecting section 500 obtains an absolute value of the output of the decision directed error detecting section 300, and outputs the absolute value to a multiplier 503. The multiplier 503 multiplies an output ($|e_{DD}|$) of the absolute value operator 502 by the output of the Godard error detecting section 400, and provides a multiplied output to a multiplier 504. The multiplier 504 multiplies an output ($|e_{DD}|e_{godard}$) of the multiplier 503 by a predetermined constant k2, and outputs the multiplied output to the adder 505

The channel equalizing section 105 receives the final error value, and updates the tap of the feed forward filter and the feedback filter as shown in equation 6 to reduce the error.

Hereinafter, the converging process that the equalizing controller 107' causes the channel equalizing section 105 to undergo according to an embodiment of the present invention will be explained with reference to equation 5 and FIG. 3.

In the event that the distortion of the signal inputted to the channel equalizing section 105 is severe, most input signals are severely distorted to be different from the original signal. Accordingly, the probability that the decision directed signal value is not the original signal is very high, and thus most decision directed error values are wrong error values.

However, since the input signal is random and white, the average of the error values is kept equal for a specified period. Accordingly, it does not deteriorate the distortion any more (even if the distortion of the input signal cannot be compensated for during this period) to include the decision directed error in the error updating equation. Thus, as shown in FIG. 4 (which shows convergence results obtained according to an example embodiment of the present invention), in a period of $t_1$ the decision directed method cannot compensate for the distortion but the Godard error method can gradually reduce the distortion and thus help the output signals of the channel equalizing section 105 (which are randomly spread over the whole period) to converge around the original signals.

Figure 4:
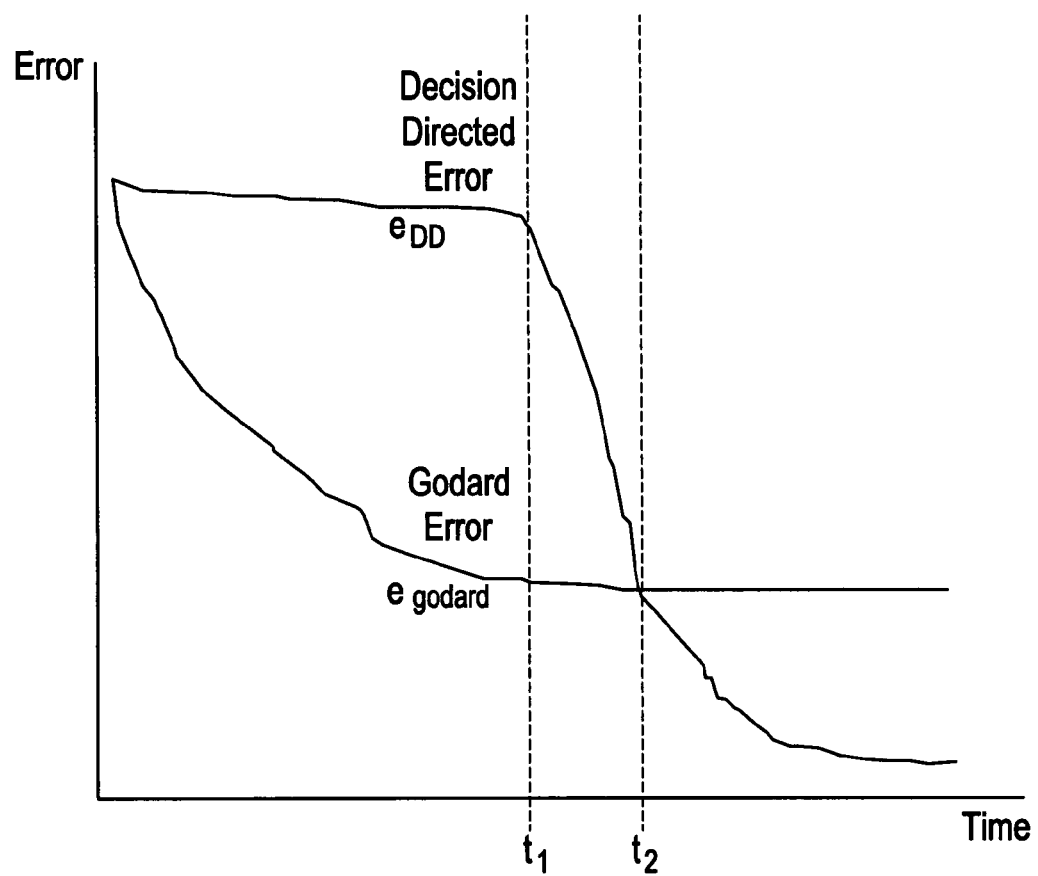
FIG. 4 is a graph illustrating the convergence characteristics of a decision directed error and a Godard error, obtained according to an embodiment of the present invention.

However, as further shown in FIG. 4, the convergence speed of the Godard equalizing method is relatively slower and (after the time $t_1$, and more so after a time $t_2$) the residual Godard error becomes relatively constant. The decision directed error signal and the Godard error converge at a time $t_2$. After the time $t_2$, the decreasing nature of the decision directed error signal has the effect that the Godard error signal becomes relatively greater than the decision directed error signal. As such, the signals spread over the whole period somewhat converge around the original signal at a time $t_2$ after the period of $t_1$. Thus, at the time $t_2$, the probability that the decision directed signal value corresponds to the original signal is greater than the probability that the decision directed signal value does not correspond to the original signal. Accordingly, beginning at time $t_2$, the whole error is gradually reduced due to the effect of the decision directed error continually being reduced, so that the output signals of the channel equalizing section 105 converge more and more on the original signal.

Also, since the Godard error has already reached its final convergence point at the time $t_1$, a uniform error is produced thereafter, and thus it does not affect the decision directed error value after the time $t_1$.

Again, as shown in FIG. 4, the Godard error is relatively constant after the convergence at the time $t_2$. After the time $t_2$, a decreasing nature of a residual error (representing the sum of the Godard error signal and the decision directed error) is somewhat masked because of the relatively constant and increasingly larger portion of the sum which the Godard error signal represents.

Thus, according to at least one embodiment of the present invention, multiplying the Godard error by the absolute value of the decision directed error to obtain a product, and then multiplying the product by different proper constant values $k_1$ and $k_2$ causes the second term of equation 5 to be abruptly reduced after the period of $t_1$ and when reaching the final convergence point, the final error value of equation 5 will be almost the same as the residual error when the decision directed method is used.

As described above, a channel equalizing method according to at least one embodiment of the present invention automatically changes from reliance upon the blind algorithm to reliance upon the decision directed algorithm. That is, it is not required to artificially set the threshold value as in the conventional method, reduce the error value by relying upon the reduced constellation algorithm and the constant modulus algorithm, and then change reliance upon the algorithm being used to the decision directed algorithm when the error reaches the threshold value.

Also, a channel equalizing method according to at least one embodiment of the present invention is easily implemented and has a good convergence characteristic in comparison to the artificial method to set the threshold value. Whereas most channel equalizer generates a frequency phase error, which changes according to time before the frequency synchronization is performed, with respect to the input signal, such an embodiment the present invention can reduce the signal distortion even if the frequency phase error exists As described above, according to at least one embodiment of the present invention, the following can be achieved. In the context of a channel equalizing apparatus, the signal distortion can be reduced without the signal training sequence, and thus the transmission efficiency can be improved. Also, since the blind equalizing method is automatically changed to the decision directed method, the complexity is reduced and the convergence characteristic is improved in comparison to the conventional method that changes the blind equalizing method to the decision directed method in an artificial manner. Also, the signal distortion can be reduced even if the frequency phase error exists in the input signal, and thus the receiving performance of the whole system can be improved.

It will be apparent to those skilled in the art that various modifications and variations can be made in the present invention. Thus, it is intended that the present invention covers the modifications and variations of this invention provided they come within the scope of the appended claims and their equivalents.

What is claimed is:

1. A channel equalizing apparatus for a digital television receiver for performing channel equalization using equalizing algorithms, the apparatus comprising:
   a channel equalizing section for compensating for channel distortion using a blind algorithm and a decision directed algorithm among the equalizing algorithms; and
   a equalizing control section for calculating error values for compensating for the channel distortion from the blind algorithm and the decision directed algorithm and controlling the channel equalizing section to compensate for the channel distortion according to the calculated error values;
   the equalizing control section including,
      a decision directed error calculating section for calculating a decision directed error value,
      a Godard error calculating section for calculating a Godard error value, and
      a final error calculating section for calculating a final error value for compensating for the channel distortion using the decision directed error value and the Godard error value; and
   wherein the decision directed error value is calculated through steps of:
      generating a decision signal from an output of the channel equalizing section; and
      calculating a difference value between a phase of the decision signal and an output phase of the channel equalizing section.

2. A channel equalizing apparatus for a digital television receiver for performing channel equalization using equalizing algorithms, the apparatus comprising:
   a channel equalizing section for compensating for channel distortion using a blind algorithm and a decision directed algorithm among the equalizing algorithms; and
   a equalizing control section for calculating error values for compensating for the channel distortion from the blind algorithm and the decision directed algorithm and controlling the channel equalizing section to compensate for the channel distortion according to the calculated error values;
   the equalizing control section including,
      a decision directed error calculating section for calculating a decision directed error value,
      a Godard error calculating section for calculating a Godard error value, and
      a final error calculating section for calculating a final error value for compensating for the channel distortion using the decision directed error value and the Godard error value; and
   wherein the Godard error value is calculated through steps of
      squaring an absolute value of an output value of the channel equalizing section;
      calculating a difference value between a squared value and a predetermined constant value; and
      multiplying the difference value by the output value of the channel equalizing section.

3. A channel equalizing apparatus for a digital television receiver for performing channel equalization using equalizing algorithms, the apparatus comprising:
   a channel equalizing section for compensating for channel distortion using a blind algorithm and a decision directed algorithm among the equalizing algorithms; and
   a equalizing control section for calculating error values for compensating for the channel distortion from the blind algorithm and the decision directed algorithm and controlling the channel equalizing section to compensate for the channel distortion according to the calculated error values;
the equalizing control section including,
a decision directed error calculating section for calculating a decision directed error value,
a Godard error calculating section for calculating a Godard error value, and
a final error calculating section for calculating a final error value for compensating for the channel distortion using the decision directed error value and the Godard error value; and
wherein the final error value is calculated through steps of:
calculating a first resultant value by multiplying the decision directed error value by a first constant;
calculating a second resultant value by multiplying an absolute value of the decision directed error value by the Godard error value;
calculating a third resultant value by multiplying the second resultant value by a predetermined second constant; and
adding the third resultant value to the first resultant value.

4. A channel equalizing apparatus for a digital television receiver for performing channel equalization using equalizing algorithms, the apparatus comprising:
a channel equalizing section for compensating for channel distortion using a blind algorithm and a decision directed algorithm among the equalizing algorithms; and
a equalizing control section for calculating error values for compensating for the channel distortion from the blind algorithm and the decision directed algorithm and controlling the channel equalizing section to compensate for the channel distortion according to the calculated error values;
wherein the error value ($e^{MCMA}$) of the equalizing control section is calculated by the following equation $$e^{MCMA} = k_1 e_{DD} + k_2 |e_{DD}| e_{godard}$$

where, $$e_{gordard} = y_n(|y(n)|^2 - R_2), R_2 = \frac{E|a_n^4|}{E|a_n^2|},$$

$e_{DD}$ denotes a decision directed error value, $e_{godard}$ a Godard error value, $y_n$ an output value of the channel equalizing section, $a_n$ the original signal sent from a transmitting end, and $k_1$, $k_2$, R2, certain constants, respectively.

5. A channel equalizing apparatus for a digital television receiver for performing channel equalization using equalizing algorithms, the apparatus comprising:
a channel equalizing section for compensating for channel distortion included in a received digital signal by performing a tap coefficient updating of a filter according to a blind
algorithm and a decision directed algorithm among the equalizing algorithms; and
a equalizing control section for calculating error values for compensating for the channel distortion from the blind algorithm and the decision directed algorithm and controlling the channel equalizing section to compensate for the channel distortion according to the calculated error values,
wherein the channel equalizing section updates the tap coefficient of the filter by applying the following equation $$c_{n+1} = c_n - \mu x_n e^{MCMA}(n)$$

where, $c_n$ denotes a tap coefficient value of the filter of the channel equalizing section, $x_n$ an input value of the channel equalizing section, $\mu$ a step size, and $e^{MCMA}$ an error value, respectively.

6. A channel equalizing apparatus for a digital television receiver for performing channel equalization using equalizing algorithms, the apparatus comprising:
a channel equalizing section for compensating for channel distortion included in a received digital signal by performing a tap coefficient updating of a filter according to a blind
algorithm and a decision directed algorithm among the equalizing algorithms; and
a equalizing control section for calculating error values for compensating for the channel distortion from the blind algorithm and the decision directed algorithm and controlling the channel equalizing section to compensate for the channel distortion according to the calculated error values,
wherein the error value ($e^{MCMA}$) of the equalizing control section is calculated by the following equation $$e^{MCMA} = k_1 e_{DD} + k_2 |e_{DD}| e_{godard}$$

where, $$e_{gordard} = y_n(|y(n)|^2 - R_2), R_2 = \frac{E|a_n^4|}{E|a_n^2|},$$

$e_{DD}$ denotes a decision directed error value, $e_{godard}$ a Godard error value, $y_n$ an output value of the channel equalizing section, $a_n$ the original signal sent from a transmitting end, and $k_1$, $k_2$, R2 certain constants, respectively.

7. The channel equalizing apparatus of claim 6, wherein the equalizing control section comprises:
a decision directed error calculating section for calculating a decision directed error value through steps of generating a decision signal from an output of the channel equalizing section, and calculating a difference value between a phase of the decision signal and an output phase of the channel equalizing section;
a Godard error calculating section for calculating a Godard error value through steps of squaring an absolute value of an output value of the channel equalizing section, calculating a difference value between a squared value and a predetermined constant value, and multiplying the difference value by the output value of the channel equalizing section; and
a final error calculating section for calculating a final error value for compensating for the channel distortion through the steps of calculating a first resultant value by multiplying the decision directed error value by a first constant, calculating a second resultant value by multiplying an absolute value of the decision directed error value by the Godard error value, calculating a third resultant value by multiplying the second resultant value by a predetermined second constant, and adding the third resultant value to the first resultant value.

8. A channel equalizing method for a digital television receiver having a channel equalizing section for performing channel equalization and an equalizing control section for controlling the channel equalizing section, the method comprising the steps of:

calculating a Godard error value by squaring an absolute value of an output value of the channel equalizing section, calculating a difference value between a squared value and a predetermined constant value, and multiplying the difference value by the output value of the channel equalizing section;

calculating a decision directed error value by generating a decision signal from the output of the channel equalizing section, and calculating a difference value between a phase of the decision signal and an output phase of the channel equalizing section;

calculating a final error value by calculating a first resultant value by multiplying the decision directed error value by a first constant, calculating a second resultant value by multiplying an absolute value of the decision directed error value by the Godard error value, calculating a third resultant value by multiplying the second resultant value by a predetermined second constant, and adding the third resultant value to the first resultant value; and compensating for channel distortion included in a received digital signal by updating a tap coefficient of a filter according to the final error value.

9. The channel equalizing method of claim 8, wherein the channel equalizing section updates the tap coefficient of the filter by applying the following equation $$c_{n+1} = c_n - \mu x_n e^{MCMA}(n)$$

where, $c_n$ denotes a tap coefficient value of the filter of the channel equalizing section, $x_n$ an input value of the channel equalizing section, $\mu$ a step size, and $e^{MCMA}$ a final error value, respectively.

10. The channel equalizing method of claim 9, wherein the final error value ($e^{MCMA}$) of the equalizing control section is calculated by the following equation $$e^{MCMA} = k_1 e_{DD} + k_2 |e_{DD}| e_{gordard}$$

where, $$e_{gordard} = y_n(|y(n)|^2 - R_2), R_2 = \frac{E|a_n^4|}{E|a_n^2|},$$

$e_{DD}$ denotes a decision directed error value, $e_{gordard}$ a Godard error value, $y_n$ an output value of the channel equalizing section, $a_n$ the original signal sent from a transmitting end, and $k_1$, $k_2$, R2 certain constants, respectively.

* * * * *